United States Patent

Sasaki et al.

[11] Patent Number: 5,514,464
[45] Date of Patent: May 7, 1996

[54] MAGNETIC RECORDING MEDIUM

[75] Inventors: Isao Sasaki, Tomobe; Kazuhiro Takeda; Masamichi Saito, both of Mito; Osamu Kobayashi, Tomobe; Kenichi Kikuchi; Shigeru Nakano, both of Mito, all of Japan

[73] Assignee: Victor Company Of Japan, Ltd., Yokohama, Japan

[21] Appl. No.: 225,933

[22] Filed: Apr. 11, 1994

Related U.S. Application Data

[63] Continuation of Ser. No. 798,312, Nov. 26, 1991, abandoned.

[30] Foreign Application Priority Data

Nov. 27, 1990 [JP] Japan ..................................... 2-327187

[51] Int. Cl.$^6$ .............................. B32B 5/16; G11B 5/66
[52] U.S. Cl. ..................... 428/323; 428/324; 428/331; 428/694 B; 428/694 BS; 428/694 BN; 428/694 ST; 428/694 SL; 428/900
[58] Field of Search ..................................... 428/323, 900, 428/324, 331, 694 B, 694 BS, 694 BN, 694 ST, 694 SL

[56] References Cited

U.S. PATENT DOCUMENTS 4,746,558 3/1988 Shimozawa ........................ 428/141
4,863,793 9/1989 Ogawa ............................... 428/323
4,910,068 3/1990 Takagi ............................... 428/141

FOREIGN PATENT DOCUMENTS 0162788 11/1985 European Pat. Off. .
0226162 6/1987 European Pat. Off. .
0442422 8/1991 European Pat. Off. .

OTHER PUBLICATIONS

Patent Abstracts of Japan, vol. 14, No. 92 (P–1009), 20 Feb. 1990.
Patent Abstracts of Japan, vol. 8, No. 159 (P–289) (1596), 24 Jul. 1984.

*Primary Examiner*—Leszek Kiliman
*Attorney, Agent, or Firm*—Jacobson, Price, Holman & Stern

[57] ABSTRACT

A magnetic recording medium comprising an undercoat layer formed on one side or both sides of a non-magnetic substrate and a magnetic layer formed on the undercoat layer, characterized in that the undercoat layer contains powders having an average particle size of 0.5 to 5.0 μm and an aspect ratio of 5.0 or more and a magnetic recording medium comprising a magnetic layer formed on a non-magnetic substrate, characterized in that the non-magnetic substrate contains powders having an average particle size of 0.5 to 5.0 μm and an aspect ratio of 5.0 or more.

2 Claims, 1 Drawing Sheet

MAGNETIC RECORDING MEDIUM

This is a continuation of application Ser. No. 07/798,312, filed Nov. 26, 1991 which was abandoned upon the filing hereof.

FIELD OF THE INVENTION

This invention relates to a magnetic recording medium of a magnetic tape, etc.

BACKGROUND OF THE INVENTION

An illustration is given for a general structure of a magnetic recording medium including a magnetic tape used for video tape, etc., based on FIG. 1. In the structure, there is formed a magnetic layer 3 via an undercoat layer 2 on one side of a non-magnetic substrate 1, such as polyester, and there is formed a back coating layer 4, to which carbon black for leaking static electricity is added, on one side of the non-magnetic substrate 1 which is the opposite side to the magnetic layer 3. In the necessary case, there is also formed an undercoat layer between the non-magnetic substrate 1 and the back coating layer. That is, the undercoat layer is formed on one side or both sides of the substrate. However, a magnetic recording medium is fundamentally of structure in which a magnetic layer is formed on one side of non-magnetic substrate such as polyester.

Recently, as requirement for a long time recording is called forth, so the magnetic recording medium should be made thin to meet the requirement. However, if the medium is made thin, physical properties such as tensile elastic modulus are decreased, resulting in tendency to tape cutting or edge damage and electromagnetic transformation property is also decreased. To overcome this problem there are used polyethylene naphthalate (PEN), etc., which have a high mechanical strength as a non-magnetic substrate, but satisfactory advantage is so far not obtainable.

SUMMARY OF THE INVENTION

It is an object of the present invention to ovecome the problem and to provide a magnetic recording medium improved in electromagnetic transformation property and physical property.

The present invention provides a magnetic recording medium comprising an undercoat layer formed on one side or both sides of a non-magnetic substrate and a magnetic layer formed on the undercoat layer, characterized in that said undercoat layer contains powders having an average particle size of 0.5 to 5.0 μm and an aspect ratio of 5.0 or more.

Also, the present invention provides, in a magnetic recording medium forming a magnetic layer on a non-magnetic substrate, the magnetic recording medium characterized that said non-magnetic substrate contains powders having an average particle size of 0.5 to 5.0 μm and an aspect ratio of 5.0 or more.

BRIEF DESCRIPTION OF THE INVENTION

In the drawing, the sole FIGURE represents a sectional diagram for showing the structure of one example of a magnetic tape.

DETAILED DESCRIPTION OF THE INVENTION

Figure 1:
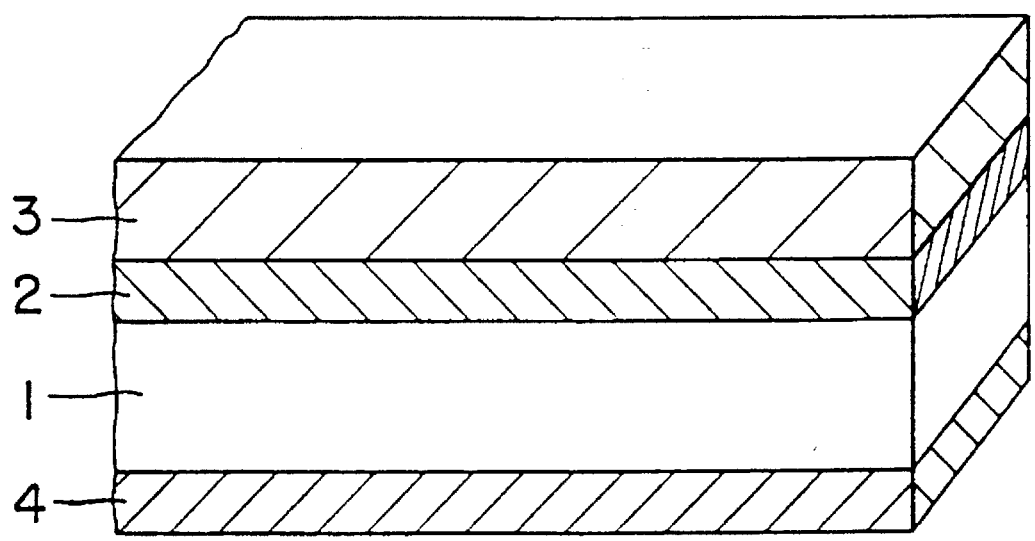

Hereinunder, this invention is minutely illustrated.

As well known, a magnetic recording medium such as magnetic tape fundamentally has a structure in which a magnetic layer is formed on one side of a non-magnetic substrate. Generally, an undercoat layer is provided between the substrate and the magnetic layer for the purpose of enhancing adhesion between the both. On the surface of the substrate in the opposite side to the magnetic layer, a backcoat layer is preferably provided for preventing charging, etc. The above-mentioned undercoat layer is sometimes provided between the substrate and this back coating layer to enhance adhesion between both the layers.

The thickness of respective layers is preferably 5 μm or more for a non-magnetic substrate, 2.0 to 3.0 μm for a magnetic layer, 0.5 to 3.0 μm for an undercoat layer and 0.5 to 1.0 μm for a back coating layer.

A non-magnetic substrate (base) is preferably formed into a shape such as tape, sheet or film by adding fillers, etc. as a reinforcing agent to a raw material such as polyesters such as polyethylene terephthalate (PET) or polyethylene naphthalate (PEN) or aramids. When using polyethylene naphthalate, the thickness can be made thinner by 20% than the case of polyethylene terephthalate.

Binders, curing agents, dispersing agents, lubricants, abrasives, antistatic agents, etc. are preferably contained in a magnetic layer in addition to magnetic powders such as cobalt-modified iron oxide. Powders, binders, curing agents, etc. are contained in an under coat layer. Antistatic agents, binders, curing agents, etc. are contained in a back coating layer.

As said powders, $Al_2O_3$, mica, $\alpha\text{-}Fe_2O_3$, Ba—Fe, $MoO_3$, CdO, ZnO, $CrO_3$, $PbO_3$, $Co(OH)_2$, $Pb(OH)_4$, $CaWO_4$, $CaCu_4ClO$, AgBr, $BaSO_4$, $PbI_2$, $MgCO_3$, kaolinite, are used and particularily, powders of $Al_2O_3$, mica, $\alpha\text{-}Fe_2O_3$ and Ba—Fe are preferably used. These may be solely or combinedly used. These powders are added as a reinforcing agent.

As a binder are used vinyl chloride polymers, vinyl chloride/vinyl acetate copolymers, cellulose derivatives, polyurethane resins, etc. As lubricants and dispersing agents are used fatty acids and the derivatives thereof such as fatty acid esters or fatty acid metals. Stearic acid and butyl stearate are preferably used. Said compounds such as binders, lubricants and dispersing agents can be solely or combinedly used. In addition to this, for example, $Cr_2O_3$ and for example, carbon black are used as an abrasive and as an antistatic agent, respectively. Isocyanate series curing agents are generally used as a curing agent.

Besides, an organic solvent is used for preparing a paint for each layer by mixing these components to disperse or dissolve. As these organic solvents, ketone solvents such as acetone, methyl ethyl ketone, methyl isobutyl ketone or cyclohexane (anone) and aromatic hydrocarbon solvents such as benzene or toluene are preferably used. These solvents can be solely used but generally can be combinedly used.

In this invention, for the non-magnetic substrate or undercoat layers consisting of said each component are used powders having an average particle size of 0.5 to 5.0 μm and an aspect ratio of 5.0 or more.

According to one aspect of this invention, when making a magnetic recording medium having an undercoat layer formed on one side or both sides of a non-magnetic substrate and having a magnetic layer on one side of the undercoat layer, powders having an average particle size of 0.5 to 5.0 μm and an aspect ratio of 5.0 or more are contained in the undercoat layer. More detailedly illustrating, in a magnetic recording medium having a magnetic layer on one side of the non-magnetic substrate, a back coating layer on the other side thereof and an undercoat layer on one side or both sides of the substrate, that is, in a magnetic recording medium wherein an undercoat layer is provided between the substrate and the magnetic layer or further between the substrate and the back coating layer, powders having the above-mentioned average particle size and aspect ratio are used for the undercoat layer.

When an undercoat layer is formed on both sides of non-magnetic substrate, powders having said particle size and aspect ratio may be contained into an undercoat layer of both sides. When an undercoat layer is provided on one side or both sides of a substrate to form a magnetic layer thereon, the above-mentioned powders may be contained generally on one side or both sides of the undercoat layer and is not necessary to contain into a magnetic layer.

According to the other aspect of this invention, in the case of a magnetic recording medium having a magnetic layer formed on a non-magnetic substrate, powders having an average particle size of 0.5 to 5.0 μm and an aspect ratio of 5.0 or more are contained in the non-magnetic substrate.

By using powders having such average particle size and aspect ratio for a non-magnetic substrate or an undercoat layer, a magnetic recording medium which is greatly improved in electromagnetic transformation property, durability and runnability can be obtained. When the aspect ratio is lower than 5.0 or the average particle size is lower than 0.5 μm, tensile strength of coating film is not sufficient, failing to obtain satisfactory properties, and when powders having an average particle size of 5.0 μm or more are used, smoothness of surface and flexibility is lost, deteriorating properties. Herein, the aspect ratio is meant by a value in which a particle size in powders is divided by a thickness thereof. In 5.0 or more of the value, powders become a relatively plate shape, in which case the average particle size may be referred to as the average plate size defined diametrically across the plate-shaped powders.

When preparing a magnetic recording medium from these components, a starting material consisting of said substrate raw material and fillers is mixed to form a non-magnetic substrate (base) such as films or sheet by means of a biaxially drawing method, a solvent casting method, a melt extrusion method, etc. On the other hand, a magnetic layer paint is prepared by mixing for dispersing a magnetic layer starting material comprising magnetic powders, binders, dispersing agents, lubricants, abrasives, antistatic agents, etc. by the use of a sand mill, etc. into an organic solvent and further mixing curing agents thereto. The magnetic layer paint thus prepared is applied on the non-magnetic substrate previously formed to form a magnetic recording medium such as a magnetic tape via respective steps such as post orientation, calendering, curing, surface polishing or slitting. Besides, when an undercoat layer on one side or both sides of a non-magnetic substrate and further a back coating layer are optionally formed, paints for respsective layers are similarly prepared and are applied in order for obtaining a magnetic recording medium in a desired embodiment.

Hereinunder, Examples and Comparative Examples of this invention are described. Examples 1 to 19 concern examples of the case which contain specific powders into the undercoat layer and Comparative Examples 1 to 8 correspond thereto. On the other hand, Examples 20 to 27 concern examples of the case which contain specific powders in the non-magnetic substrate and Comparative Examples 9 to 13 correspond thereto.

EXAMPLES

Example 1

A paint for an undercoat layer, a paint for a magnetic layer and a paint for an back coating layer consisting of the following compositions were prepared.

| (Paint for undercoat layer) | |
|---|---|
| $Al_2O_3$ (Average particle size of 1.0 um and aspect ratio of 10) | 10 parts by weight |
| Vinyl chloride/vinyl acetate copolymer | 5 parts by weight |
| Polyurethane | 5 parts by weight |
| Isocyanate curing agents | 3 parts by weight |
| Methyl ethyl ketone/toluene | 40 parts by weight |
| (Paint for magnetic layer) | |
| $Co$-$\gamma$-$Fe_2O_3$ magnetic powder | 10 parts by weight |
| Vinyl chloride/vinyl acetate copolymer | 1 part by weight |
| Polyurethane | 1 part by weight |
| Isocyanate curing agents | 0.7 part by weight |
| Methyl ethyl ketone/toluene | 40 parts by weight |
| (Paint for a back coating layer) | |
| Carbon black | 100 parts by weight |
| Nitrocellulose | 50 parts by weight |
| Polyurethane | 50 parts by weight |
| Isocyanate curing agents | 20 parts by weight |

After dispersing the paint for undercoat layer consisting of the above composition by means of a sand mill, the product thus dispersed was applied as an undercoat layer having a thickness of 1 μm to one side of a polyethylene terephthalate film having a thickness of 11 μm. Also, the paint for a magnetic layer consisting of the above composition was dispersed by means of a sand mill and then the paint was applied on said undercoat layer with a thickness of 3 μm. Further, the above paint for the back coating layer was applied to form a back coating layer having a thickness of 1 μm on the opposite side followed by performing a polishing step of the surface of the magnetic layer and slitting step to manufacture a magnetic tape having a width of ½ inch.

Example 2

The same manner as in Example 1 was repeated except that the paint for the undercoat layer in Example 1 was applied on both sides of a polyethylene terephthalate film to form the undercoat layer also between the substrate and the back coating layer, and thus a magnetic tape was manufactured.

Example 3

The same manner as in Example 1 was repeated except that mica powders having an average particle size of 1.0 μm and an aspect ratio of 15 were used in place of $Al_2O_3$ powders in Example 1, and thus a magnetic tape was manufactured.

Example 4

The same manner as in Example 3 was repeated except that the undercoat layer in Example 3 was applied on both sides of a polyethylene terephthalate film, and thus a magnetic tape was manufactured.

Example 5

The same manner as in Example 1 was repeated except that α-Fe$_2$O$_3$ powders having an average particle size of 2.0 μm and an aspect ratio of 20 were used in place of Al$_2$O$_3$ powders in Example 1, and thus a magnetic tape was manufactured.

Example 6

The same manner as in Example 1 was repeated except that Ba—Fe powders having an average particle size of 1.0 μm and an aspect ratio of 10 were used in place of Al$_2$O$_3$ powders in Example 1, and thus a magnetic tape was manufactured.

Comparative Example 1

The same manner as in Example 1 was repeated except that acicular Al$_2$O$_3$ was used in place of Al$_2$O$_3$ used in Example 1 and thus a magnetic tape was manufactured.

The result in which the electromagnetic transformation properties and mechanical strength of Examples 1 to 6 and Comparative Example 1 were compared with each other through a video tape recorder was shown in Table 1.

TABLE 1

|  | Electromagnetic transformation property (dB) | | | | | Running cycles till the tape |
| --- | --- | --- | --- | --- | --- | --- |
|  | Y-S/N | C-S/N | C-out | PM-out | Scratch | is cut |
| Example 1 | 0.3 | 0.5 | 0.2 | 1.5 | ○ | 1000 pass OK |
| Example 2 | 0.4 | 0.7 | 0.3 | 1.8 | ⊙ | 1000 pass OK |
| Example 3 | 0.3 | 0.5 | 0.3 | 1.4 | ○ | 1000 pass OK |
| Example 4 | 0.5 | 0.7 | 0.4 | 1.8 | ⊙ | 1000 pass OK |
| Example 5 | 0.5 | 0.6 | 0.5 | 1.7 | ⊙ | 1000 pass OK |
| Example 6 | 0.4 | 0.4 | 0.2 | 1.5 | ○ | 1000 pass OK |
| Comparative Example 1 | 0 | 0 | 0 | 0 | Δ | 600 pass |

The meaning of each item of electromagnetic tranformation property in Table is as follows:

Y-S/N Ratio of Output of Luminance Signal to Noise

C-S/N Ratio of Output of Chrominance Signal to Noise

C-out Output of Chrominance Signal

FM-out Output of Luminance Signal

Scratch (tape scratch) in Table is decided by visual observation of tape scratch after 1000-pass.

| Decision level | ⊙ | No scratch |
| --- | --- | --- |
|  | ○ | Small |
|  | Δ | Middle |
|  | X | Large |

This meaning or definition is similarly adopted in the following tables.

Example 7

A paint for an undercoat layer and a paint for a magnetic layer consisting of the following composition were prepared.

The same paint for a back coating layer as used in Example 1 was also prepared.

| (Paint for undercoat layer) | |
| --- | --- |
| α-Fe$_2$O$_3$ | 10 parts by weight |
| (Average particle size of 1.0 um and aspect ratio of 10) | |
| Vinyl chloride/vinyl acetate copolymer | 5 parts by weight |
| Polyurethane | 5 parts by weight |
| Isocyanate curing agents | 3 parts by weight |
| Methyl ethyl ketone/toluene | 40 parts by weight |
| (Paint for magnetic layer) | |
| Co-γ-Fe$_2$O$_3$ magnetic powder | 10 parts by weight |
| Vinyl chloride/vinyl acetate copolymer | 1 part by weight |
| Polyurethane | 1 part by weight |
| Isocyanate curing agents | 0.7 part by weight |
| Methyl ethyl ketone/toluene | 40 parts by weight |

After dispersing the paint for undercoat layer consisting of the above composition by means of a sand mill, the product thus dispersed was applied as an undercoat layer having a thickness of 1 μm on one side of a polyethylene terephthalate film having a thickness of 11 μm. Also, the paint for magnetic layer consisting of the above composition was dispersed by means of a sand mill and then the paint for the magnetic layer was applied on said undercoat layer with a thickness of 3 μm. Further, the above paint for the back coating layer was applied to form a back coating layer having a thickness of 1 μm on the other side followed by performing a polishing step of the surface of the magnetic layer and slitting step to manufacture a magnetic tape having a width of ½ inch.

Example 8

The same manner as in Example 7 was repeated except that the undercoat layer in Example 7 was applied to both sides of a polyethylene terephthalate film to form the undercoat layer also between the substrate and the back coating layer, and thus a magnetic tape was manufactured.

Example 9

The same manner as in Example 7 was repeated except that α-Fe$_2$O$_3$ having an average particle size of 1.0 μm and an aspect ratio of 5 was used in place of α-Fe$_2$O$_3$ having an average particle size of 1.0 μm and an aspect ratio of 10, and thus a magnetic tape was manufactured.

Example 10

The same manner as in Example 7 was repeated except that α-Fe$_2$O$_3$ having an average particle size of 1.0 μm and an aspect ratio of 15 was used in place of $\alpha$-$Fe_2O_3$ having an average particle size of 1.0 μm and an aspect ratio of 10, and thus a magnetic tape was manufactured.

Example 11

The same manner as in Example 7 was repeated except that $\alpha$-$Fe_2O_3$ having an average particle size of 0.5 μm and an aspect ratio of 10 was used in place of $\alpha$-$Fe_2O_3$ having an average particle size of 1.0 μm and an aspect ratio of 10, and thus a magnetic tape was manufactured.

Example 12

The same manner as in Example 7 was repeated except that $\alpha$-$Fe_2O_3$ having an average particle size of 3.0 μm and an aspect ratio of 10 was used in place of $\alpha$-$Fe_2O_3$ having an average particle size of 1.0 μm and an aspect ratio of 10, and thus a magnetic tape was manufactured.

Example 13

The same manner as in Example 7 was repeated except that $\alpha$-$Fe_2O_3$ having an average particle size of 5.0 μm and an aspect ratio of 10 was used in place of $\alpha$-$Fe_2O_3$ having an average particle size of 1.0 μm and an aspect ratio of 10, and thus a magnetic tape was manufactured.

Example 14

The same manner as in Example 8 was repeated except that the thickness of polyethylene terephthalate film was made 5 μm, and thus a magnetic tape was manufactured.

Example 15

The same manner as in Example 7 was repeated except that the polyethylene naphthalate having a thickness of 10 μm was used in place of a polyethylene terephthalate film, and thus a magnetic tape was manufactured.

Example 16

The same manner as in Example 8 was repeated except that the polyethylene naphthalate film having a thickness of 10 μm was used in place of a polyethylene terephthalate film, and thus a magnetic tape was manufactured.

Example 17

The same manner as in Example 7 was repeated except that the polyethylene naphthalate film having a thickness of 5 μm was used in place of a polyethylene terephthalate film, and thus a magnetic tape was manufactured.

Example 18

The same manner as in Example 8 was repeated except that the polyethylene naphthalate film having a thickness of 5 μm was used in place of a polyethylene terephthalate film, and thus a magnetic tape was manufactured.

Example 19

The same manner as in Example 8 was repeated except that an aramid film having a thickness of 5 μm was used in place of the polyethylene terephthalate film in Example 8, and thus a magnetic tape was manufactured.

Comparative Example 2

In Example 7 a paint for undercoat layer was not used to form a magnetic layer having a thickness of 3 μm and a back coating layer having a thickness of 1 μm on one side of a polyethylene terephthalate film and the other side, respectively, followed by performing the polishing step of the surface of a magnetic layer and slitting step to manufacture a magnetic tape having a width of ½ inch.

Comparative Example 3

The same manner as in Example 7 was repeated except that $\alpha$-$Fe_2O_3$ was not added to the paint for undercoat layer, and thus a tape was manufactured.

Comparative Example 4

The same manner as in Example 7 was repeated except that acicular $Al_2O_3$ was used in place of $\alpha$-$Fe_2O_3$, and thus a magnetic tape was manufactured.

Comparative Example 5

The same manner as in Example 7 was repeated except that $\alpha$-$Fe_2O_3$ having an average particle size of 3.0 μm and an aspect ratio of 3 was used in place of $\alpha$-$Fe_2O_3$ having an average particle size of 1.0 μm and an aspect ratio of 10, and thus a magnetic tape was manufactured.

Comparative Example 6

The same manner as in Example 7 was repeated except that $\alpha$-$Fe_2O_3$ having an average particle size of 0.3 μm and an aspect ratio of 10 was used in place of $\alpha$-$Fe_2O_3$ having an average particle size of 1.0 μm and an aspect ratio of 10, and thus a magnetic tape was manufactured.

Comparative Example 7

The same manner as in Example 7 was repeated except that $\alpha$-$Fe_2O_3$ having an average particle size of 7.0 μm and an aspect ratio of 10 was used in place of $\alpha$-$Fe_2O_3$ having an average particle size of 1.0 μm and an aspect ratio of 10, and thus a magnetic tape was manufactured.

Comparative Example 8

The same manner as in Example 8 was repeated except that the thickness of polyethylene terephthalate film was changed from 11 μm to 3.0 μm, and thus a magnetic tape was manufactured.

The electromagnetic transformation property and mechanical strength in Examples 7 to 19 and Comparative Examples 2 to 8 were compared with each other and the result thus obtained is shown in Table 2.

TABLE 2

|  | Electromagnetic transformation property (dB) | | | Scratch | Running cycles till the tape is cut |
| --- | --- | --- | --- | --- | --- |
|  | Y-S/N | C-S/N | PM-out | | |
| Example 7 | 0.3 | 0.4 | 1.4 | Δ | 1000 pass OK |
| Example 8 | 0.6 | 0.4 | 1.0 | ○ | 1000 pass OK |
| Example 9 | 0.2 | 0.3 | 1.3 | ○ | 1000 pass OK |
| Example 10 | 0.3 | 0.2 | 1.3 | ⊙ | 1000 pass OK |
| Example 11 | 0.1 | 0.2 | 1.2 | ○ | 1000 pass OK |
| Example 12 | 0.2 | 0.2 | 1.5 | ⊙ | 1000 pass OK |
| Example 13 | 0.3 | 0.2 | 1.5 | ⊙ | 1000 pass OK |
| Example 14 | 0.1 | 0.1 | 1.2 | Δ | 1000 pass OK |
| Example 15 | 0.5 | 0.4 | 1.6 | ○ | 1000 pass OK |
| Example 16 | 0.7 | 0.4 | 1.2 | ○ | 1000 pass OK |
| Example 17 | 0.4 | 0.4 | 1.6 | Δ | 1000 pass OK |
| Example 18 | 0.7 | 0.6 | 1.7 | ○ | 1000 pass OK |
| Example 19 | 1.0 | 0.9 | 1.8 | ○ | 1000 pass OK |
| Comparative Example 2 | 0 | 0 | −0.6 | x | 550 pass |
| Comparative Example 3 | 0 | 0 | −0.6 | x | 600 pass |
| Comparative Example 4 | 0.1 | 0 | −0.5 | Δ | 600 pass |
| Comparative Example 5 | 0.2 | 0.1 | 0.2 | Δ | 850 pass |
| Comparative Example 6 | 0.1 | 0.1 | −0.5 | Δ | 700 pass |
| Comparative Example 7 | 0 | −0.1 | −0.9 | ○ | 840 pass |
| Comparative Example 8 | 0.1 | 0.1 | 0.2 | ○ | 810 pass |

As is clearly seen from Table 1 and Table 2 mentioned above, it is understood that electromagnetic transformation property, durability and running property are significantly improved by adopting specific powders into an undercoat layer.

However, it is preferably that the aspect ratio of specific powders is at least 5.0 and the average particle size thereof is 0.5 to 5.0 μm. This is because when the aspect ratio is not more than 5.0 or the average particle size is not more than 0.5 μm, tensile strength of coated film becomes insufficient to obtain statisfactory property and when the average particle size becomes larger than 5.0 μm, smoothness of surface and flexibility are lost to deteriorate properties. When a film of polyethylene naphthalate or aramid is used as a non-magnetic substrate, good property can be maintained even if it is made thin.

Example 20

A non-magnetic substrate material and a paint for magnetic layer consisting of the following composition were prepared. The same paint for a back coating layer as used in Example 1 were also prepared.

| (Non-magnetic substrate material) | |
| --- | --- |
| Polyethylene naphthalate | 90 parts by weight |
| α-Fe$_2$O$_3$ (average particle size of 0.5 um and aspect ratio of 10) | 10 parts by weight |
| (Paint for magnetic layer) | |
| Co-γ-Fe$_2$O$_3$ magnetic powder (BET value = 35 m$^2$g$^{-1}$) | 500 parts by weight |
| Lecithin | 5 parts by weight |
| Vinyl cloride/vinyl acetate copolymer | 50 parts by weight |
| Polyurethane | 50 parts by weight |

-continued

| | |
| --- | --- |
| Cr$_2$O$_3$ | 35 parts by weight |
| Anone/toluene (weight ratio = 3/1) | 855 parts by weight |

The above-mentioned non-magnetic substrate material was mixed to prepare a non-magnetic film by subjecting the material thus mixed to biaxially drawing methods, solvent casting methods, melt extrusion methods, etc. On the other hand, a paint for magnetic layer consisting of the above-mentioned composition was mixed for dispersion followed by adding 15 parts by weight of an isocyanate curing agents and 2 parts by weight of an ester series lubricant for dispersion.

Then, on one side of the above-mentioned non-magnetic film was applied a paint for magnetic layer, to form a magnetic layer in a thickness of 3 μm and on the other side of the non-magnetic film, a back coating layer in a thickness of 1 μm was formed to manufacture a magnetic tape via orientation, calendering, curing, and the polishing step of magnetic layer surface and slitting step.

Example 21

The same manner as in Example 20 was repeated except that α-Fe$_2$O$_3$ having an average particle size of 1.0 μm and an aspect ratio of 10 was used in place of α-Fe$_2$O$_3$ (base filler) having an average particle size of 0.5 μm and an aspect ratio of 10, and thus a magnetic tape was manufactured.

Example 22

The same manner as in Example 20 was repeated except that α-Fe$_2$O$_3$ having an average particle size of 3.0 μm and an aspect ratio of 10 was used in place of α-Fe$_2$O$_3$ (base filler) having an average particle size of 0.5 μm and an aspect ratio of 10, and thus a magnetic tape was manufactured.

Example 23

The same manner as in Example 20 was repeated except that α-Fe₂O₃ having an average particle size of 5.0 μm and an aspect ratio of 10 was used in place of α-Fe₂O₃ (base filler) having an average particle size of 0.5 μm and an aspect ratio of 10, and thus a magnetic tape was manufactured.

Example 24

The same manner as in Example 20 was repeated except that α-Fe₂O₃ having an average particle size of 0.5 μm and an aspect ratio of 5 was used in place of α-Fe₂O₃ (base filler) having an average particle size of 0.5 μm and an aspect ratio of 10, and thus a magnetic tape was manufactured.

Example 25

The same manner as in Example 20 was repeated except that α-Fe₂O₃ having an average particle size of 0.5 μm and an aspect ratio of 20 was used in place of α-Fe₂O₃ (base filler) having an average particle size of 0.5 μm and an aspect ratio of 10, and thus a magnetic tape was manufactured.

Example 26

The same manner as in Example 20 was repeated except that α-Fe₂O₃ having an average particle size of 0.5 μm and an aspect ratio of 50 was used in place of α-Fe₂O₃ (base filler) having an average particle size of 0.5 μm and an aspect ratio of 10, and thus a magnetic tape was manufactured.

Example 27

The same manner as in Example 20 was repeated except that α-Fe₂O₃ having an average particle size of 0.5 μm and an aspect ratio of 90 was used in place of α-Fe₂O₃ (base filler) having an average particle size of 0.5 μm and an aspect ratio of 10, and thus a magnetic tape was manufactured.

Comparative Example 9

The same manner as in Example 20 was repeated except that α-Fe₂O₃ having an average particle size of 0.3 μm and an aspect ratio of 10 was used in place of α-Fe₂O₃ (base filler) having an average particle size of 0.5 μm and an aspect ratio of 10, and thus a magnetic tape was manufactured.

Comparative Example 10

The same manner as in Example 20 was repeated except that α-Fe₂O₃ having an average particle size of 0.5 μm and an aspect ratio of 3 was used in place of α-Fe₂O₃ (base filler) having an average particle size of 0.5 μm and an aspect ratio of 10, and thus a magnetic tape was manufactured.

Comparative Example 11

The same manner as in Example 20 was repeated except that α-Fe₂O₃ (base filler) having an average particle size of 0.5 μm and an aspect ratio of 10 was not added, and thus a magnetic tape was manufactured.

Comparative Example 12

The same manner as in Example 20 was repeated except that α-Fe₂O₃ having an average particle size of 1.0 μm and a spherical form was used in place of α-Fe₂O₃ (base filler) having an average particle size of 0.5 μm and an aspect ratio of 10, and thus a magnetic tape was manufactured.

Comparative Example 13

The same manner as in Example 20 was repeated except that α-Fe₂O₃ having an average particle size of 7.0 μm and an aspect ratio of 10 was used in place of α-Fe₂O₃ (base filler) having an average particle size of 0.5 μm and an aspect ratio of 10, and thus a magnetic tape was manufactured.

The result of the comparison of the electromagnetic transformation property and mechanical strength of Examples 20 to 27 and Comparative Examples 9 to 13 is shown in Table 3.

Meanwhile, in each of the above-mentioned Examples 1 to 27, as powders, Al₂O₃, mica, α-Fe₂O₃ and Ba—Fe were quoted; however, in addition to those, MoO₃, CdO, ZnO, CrO₃, PbO₃, Co(OH)₂, Pb(OH)₄, CaWO₄, CaCu₄ClO, AgBr, BaSO₄, PbI₂, MgCO₃, kaolinite, are used.

TABLE 3

| | Average particle size (μm) | Aspect ratio | PM-out (dB) | Tape Scratch |
|---|---|---|---|---|
| Example 20 | 0.5 | 10 | 1.2 | ○ |
| Example 21 | 1.0 | 10 | 1.5 | ○ |
| Example 22 | 3.0 | 10 | 1.9 | ○ |
| Example 23 | 5.0 | 10 | 1.7 | ○ |
| Example 24 | 0.5 | 5 | 1.0 | ○ |
| Example 25 | 0.5 | 20 | 1.8 | ○ |
| Example 26 | 0.5 | 50 | 1.8 | ○ |
| Example 27 | 0.5 | 90 | 2.1 | ○ |
| Comparative Example 9 | 0.3 | 10 | 0.3 | Δ |
| Comparative Example 10 | 0.5 | 3 | 0.5 | Δ |
| Comparative Example 11 | — | — | −0.9 | x |
| Comparative Example 12 | 1.0 | spherical | −0.7 | x |
| Comparative Example 13 | 7.0 | 10 | 0.5 | Δ |

As is clearly from the above Tables 1 to 3, according to the present invention, by mixing powders having an aspect ratio of at least 5.0 and an average particle size of 0.5 to 5.0 μm into an undercoat layer or a non-magnetic substrate, a magnetic recording medium improved in electromagnetic transformation property and durability can be obtained.

What is claimed is:

1. A magnetic recording medium comprising an undercoat layer formed on at least one side of a non-magnetic substrate and a magnetic layer formed on the undercoat layer, characterized in that said undercoat layer contains plate-shaped powders having an average plate size of 0.5 to 5.0 μm and an aspect ratio of 5.0 or more, wherein said aspect ratio is defined as the average plate size of the plate-shaped powders divided by the thickness thereof, said average plate size being defined diametrically across the plate-shaped powders, said non-magnetic substrate being comprised of polyethylene naphthalate or aramid, and said plate-shaped powders being selected from the group consisting of Al₂O₃, mica, α-Fe₂O₃, Ba—Fe, MoO₃, CdO, ZnO, CrO₃, PbO₃, Co(OH)₂, Pb(OH)₄, CaWO₄, CaCu₄ClO, AgBr, BaSO₄, PbI₂, MgCO₃ and kaolinite.

2. A magnetic recording medium comprising a magnetic layer formed on a non-magnetic substrate, characterized in that said non-magnetic substrate contains plate-shaped powders having an average plate size of 0.5 to 5.0 μm and an aspect ratio of 5.0 or more, wherein said aspect ratio is defined as the average plate size of the plate-shaped powders divided by the thickness thereof, said average plate size being defined diametrically across the plate-shaped powders, said non-magnetic substrate being comprised of polyethylene naphthalate or aramid, and said plate-shaped powders being selected from the group consisting $Al_2O_3$, mica, $\alpha$-$Fe_2O_3$, Ba—Fe, $MoO_3$, CdO, ZnO, $CrO_3$, $PbO_3$, $Co(OH)_2$, $Pb(OH)_4$, $CaWO_4$, $CaCu_4ClO$, AgBr, $BaSO_4$, $PbI_2$, $MgCO_3$ and kaolinite.

* * * * *